(12) United States Patent
Chang et al.

(10) Patent No.: US 11,403,546 B2
(45) Date of Patent: Aug. 2, 2022

(54) FAULT MONITORING METHOD FOR SEWAGE TREATMENT PROCESS BASED ON FUZZY WIDTH ADAPTIVE LEARNING MODEL

(71) Applicant: BEIJING UNIVERSITY OF TECHNOLOGY, Beijing (CN)

(72) Inventors: Peng Chang, Beijing (CN); Chunhao Ding, Beijing (CN); Ruiwei Lu, Beijing (CN); Zeyu Li, Beijing (CN); Kai Wang, Beijing (CN)

(73) Assignee: BEIJING UNIVERSITY OF TECHNOLOGY, Beijing (CN)

( * ) Notice: Subject to any disclaimer, the term of this patent is extended or adjusted under 35 U.S.C. 154(b) by 0 days.

(21) Appl. No.: 17/508,911

(22) Filed: Oct. 22, 2021

(65) Prior Publication Data
US 2022/0114467 A1 Apr. 14, 2022

Related U.S. Application Data

(63) Continuation of application No. PCT/CN2019/124479, filed on Dec. 11, 2019.

(30) Foreign Application Priority Data

Dec. 3, 2019 (CN) .......................... 201911225929.3

(51) Int. Cl.
*G06N 7/00* (2006.01)
*G06N 7/02* (2006.01)
*C02F 1/00* (2006.01)

(52) U.S. Cl.
CPC ............. *G06N 7/023* (2013.01); *C02F 1/008* (2013.01)

(58) Field of Classification Search
CPC ...................................................... G06N 7/023
(Continued)

(56) References Cited

FOREIGN PATENT DOCUMENTS

| CN | 105740619 A | 7/2016 |
| CN | 106802563 A | 6/2017 |

(Continued)

OTHER PUBLICATIONS

Han et al ("A fuzzy neural network approach for online fault detection in waste water treatment process" 2014) (Year: 2014).*

(Continued)

*Primary Examiner* — Lut Wong
(74) *Attorney, Agent, or Firm* — J.C. Patents

(57) ABSTRACT

The invention discloses a sewage treatment process fault monitoring method based on fuzzy width adaptive learning model. Including "offline modeling" and "online monitoring" two stages. "Offline modeling" first uses a batch of normal data and 4 batches of fault data as training samples to train the network offline and label the data. After the network training is completed, the weight parameters are obtained for online monitoring. "Online monitoring" includes: using newly collected data as test data, using the same steps as offline training networks for online monitoring. The output result of online monitoring adopts one-hot encoding to realize zero-one discrimination of the output result of online monitoring, so as to realize fault monitoring. The present invention only needs to increase the number of enhanced nodes, reconstruct in an incremental manner, and does not need to retrain the entire network from the beginning. It can complete the network training in a short time and realize the rapid fault monitoring in time, which has high practical application value.

1 Claim, 7 Drawing Sheets

(58) Field of Classification Search
USPC .......................................................... 706/12
See application file for complete search history.

(56) References Cited

FOREIGN PATENT DOCUMENTS

| CN | 108628291 | 10/2018 |
| CN | 110232256 | 9/2019 |
| JP | 3301428 B2 | 7/2002 |

OTHER PUBLICATIONS

Newhart et al ("Data-driven performance analyses of wastewater treatment plants: A review" (2019) (Year: 2019).*
The International Search Report of PCT/CN2019/124479.

* cited by examiner

FAULT MONITORING METHOD FOR SEWAGE TREATMENT PROCESS BASED ON FUZZY WIDTH ADAPTIVE LEARNING MODEL

CROSS-REFERENCE TO RELATED APPLICATIONS

This application is a continuation of International Application No. PCT/CN2019/124479, filed on Dec. 11, 2019, which claims priority to Chinese Patent Application No. 201911225929.3, filed on Dec. 3, 2019. The contents of the above applications are hereby incorporated by reference in their entireties and form a part of this specification.

TECHNICAL FIELD

The present invention relates to the technical field of fault monitoring based on data-driven, in particular to a fault monitoring technology for sewage treatment processes. The fault monitoring method of the present invention for the intermittent process is a specific application in the fault monitoring of the sewage treatment process.

BACKGROUND ART

In recent years, with the advancement of science and technology, the process of industrialization and urbanization has been accelerating, the number of people has continued to increase, and the pollution of the ecological environment has become increasingly serious. Among them, as an essential water resource for human life, due to its shortage and serious pollution, the protection of the water environment has become the consensus of today's society. People are seeking a practical way to protect the water environment, and sewage treatment plants are used as water resources. The key link in the environmental protection chain has received extensive attention from the outside world. The primary purpose of a sewage treatment plant is to ensure that its final product, that is, the quality of the effluent, can meet the prescribed discharge standards, and then improve the efficiency of sewage treatment on this basis to save costs. The prerequisite for achieving this goal is that the sewage treatment plant must be in a safe and stable operating state. Therefore, it is necessary to establish an effective process monitoring program to detect abnormal phenomena in time.

At present, neural network-based fault monitoring methods based on machine learning are widely used in the field of fault monitoring in sewage treatment processes, such as DBN (Deep Belief Network), DBM (Deep Boltzmann Machine), ANN (Artificial Neural Network), AE (Auto-encoder)) and other methods. The currently popular deep neural networks have very powerful performance, but due to the large number of hyperparameters and complex structures involved, the training of the network is a very time-consuming process. In addition, the complexity of the deep network structure itself makes theoretical analysis of its deep structure very difficult. At present, most researches focus on adjusting parameters such as network weights or stacking more layers to obtain higher accuracy. Therefore, it takes a lot of time and expensive equipment and other hardware resources. Modern fast-paced industrial production process is difficult to meet these conditions.

SUMMARY

In order to solve the above problems, a fault monitoring method for sewage treatment process based on fuzzy width adaptive learning model is proposed. The method includes a set of first-order TS fuzzy subsystem and enhanced node layer. First, each fuzzy subsystem processes the input data, and then connects the processed intermediate values as vectors and sends them to the enhanced node group for nonlinear conversion. Secondly, the output of the enhancement layer and the defuzzification output of the fuzzy subsystem are used to generate the final model output. The parameters of the model include the enhanced node group and the final output connection weight. The coefficients of the subsequent parts of fuzzy rules in each fuzzy subsystem can be quickly calculated by pseudo-inverse calculations. Different from the traditional deep network, this method only needs to reconstruct the model in an incremental manner, without retraining entire network from scratch. On the premise of ensuring that the accuracy meets the requirements, the characteristic of fuzzy width learning system to continuously adjust itself with the production process makes it possible to realize online fault monitoring sewage treatment process.

The technical scheme and implementation steps adopted by the present invention include "network training phase" and "online monitoring phase". The specific steps are as follows:

A. Network Training Stage:

1) Collect historical data $\{X, Y\}$ of the sewage treatment process as training data, where $X=(x_1, x_2, \ldots, x_N)^T \in \mathbb{R}^{N \times M}$, $Y=(y_1, y_2, \ldots, y_C)^T \in \mathbb{R}^{N \times C}$, Y is used as label data, the label is 0 during the normal period of the process, and the label data is 1 during the fault period. N is the number of input samples, M is the number of variables, and C is the dimension of the corresponding output (in this method, the output dimension is 2, which means normal and faulty states).

2) For input data $X=(x_1, x_2, \ldots, x_N)^T \in \mathbb{R}^{N \times M}$, $X_s=(x_{s1}, x_{s2}, \ldots, x_{sM})$, $s=1, 2, \ldots, N$. The model has n fuzzy subsystems, m enhanced node groups, and the i-th fuzzy subsystem contains K fuzzy rules. The first-order TS fuzzy model is used, where the i-th fuzzy subsystem is taken as an example (i=1, 2, ..., n). When the input data is the s-th training sample, the output of i-th fuzzy subsystem and k-th fuzzy rule is:

$$z_{sk}^i = f_k^i(x_{s1}, x_{s2}, \ldots, x_{sM}) = \sum_{t=1}^{M} \alpha_{kt}^i x_{st}$$

Wherein $f_k^i$ is a polynomial of the first degree, $\alpha_{kt}^i$ is a parameter obtained by initialization which obeys uniform distribution [0,1], t=1, 2, ..., M, k=1, 2, ..., K is the number of variables.

3) For the s-th training sample, calculate weighted strength $\omega_{sk}^i$ of k-th fuzzy rule of the i-th fuzzy subsystem:

$$\omega_{sk}^i = \frac{\tau_{sk}^i}{\sum_{k=1}^{k_i} \tau_{sk}^i}$$

Where $\tau_{sk}^i$ represents weighted strength of the kth fuzzy rule of i-th fuzzy subsystem (k=1, 2, ..., K) when the input training sample is Xs (xs=(xs1, xs2, ..., xsM)), the formula is as follows:

$$\tau_{sk}^i = \prod_{t=1}^{M} \mu_{kt}^i(x_{st})$$

Where $\mu_{kt}^i(x_{st})$ is the Gaussian membership function (t=1, 2, ..., M) corresponding to the input sample $X_{st}$, and its formula is expressed as:

$$\mu_{kt}^i(x_{st}) = e^{-\left(\frac{x_{st}-c_{kt}^i}{\delta_{kt}^i}\right)^2}$$

Wherein $c_{kt}^i$ and $\delta_{kt}^i$ are parameters, and the value of $c_{kt}^i$ is the value of cluster center obtained by C-means clustering, $\delta_{kt}^i=1$ 4) Calculate the output $Z^n$ of n fuzzy subsystems corresponding to sth training sample:

$$Z^n = (Z_1, Z_2, \ldots, Z_n) \in \mathbb{R}^{N \times (k_1+k_2+\ldots k_n)}$$

Wherein, $Z_1, Z_2, \ldots, Z_n$ respectively correspond to the output of n subsystems, $k_1, k_2, \ldots, k_n$ respectively correspond to the number of fuzzy rules of n fuzzy subsystems, and the sth training sample.

Taking i-th fuzzy subsystem as an example, for all training samples, the output matrix $Z_i$ is obtained by the following formula:

$$Z_i = (Z_{1i}, Z_{2i}, \ldots, Z_{Ni})^T \in \mathbb{R}^{N \times K}, i=1,2,\ldots,n$$

Wherein, $Z_{1i}, Z_{2i}, \ldots, Z_{Ni}$ respectively represent the output vector of i-th fuzzy subsystem for N training samples. Taking s-th sample as an example, the output vector of i-th fuzzy subsystem can be obtained by the following formula:

$$Z_{si} = (\omega_{s1}^i z_{s1}^i, \omega_{s2}^i z_{s2}^i, \ldots, \omega_{sk_1}^i z_{sk_1}^i)$$

Wherein, $z_{sk}^i$ and $\omega_{sk}^i$ are obtained by 2) and 3) respectively, and k=1, 2, ..., K.

5) Input the output $Z^n$ obtained in 4) into m enhanced node groups mentioned in 2) for nonlinear conversion. Wherein, the j-th enhanced node group has Lj neurons (j=1, 2, ..., m). For m enhanced node groups, the output matrix can be expressed as:

$$H^m = (H_1, H_2, \ldots, H_m) \in \mathbb{R}^{N \times (L_1+L_2+\ldots L_m)}$$

Wherein, $L_1, L_2, \ldots, L_m$ respectively represent the number of neurons contained in m enhanced node groups, $H_1 = \xi_j(Z^n W_j + \beta_j) \in \mathbb{R}^{N \times L_j}$ is the output matrix of j-th enhanced node group, and Wj represents connection weight between fuzzy subsystem output and the corresponding enhanced node group, βj represents the deviation between output of fuzzy subsystem and j-th enhanced node group, the values of Wj and βj are randomly generated from [0,1], ξj is the activation function, and the formula is ξj=tan h(·).

6) Calculate the defuzzification output of fuzzy subsystem. Then for s-th training sample $X_s$, the defuzzification output vector of i-th fuzzy subsystem can be expressed as:

$$F_{si} = \sum_{k=1}^{k_i} \omega_{sk}^i z_{sk}^i = \sum_{k=1}^{k_i} \left( \omega_{sk}^i \sum_{t=1}^{M} \alpha_{kt}^i x_{st} \right)$$

Introduce parameter $\delta_{kc}^i$ to the result part of each fuzzy rule. The parameter value is obtained by pseudo-inverse operation method, and C represents dimension of output.

Since $Y = \in \mathbb{R}^{N \times C}$ has C dimensions, each fuzzy subsystem is a multi-output model. After the parameter is introduced, its new output is:

$$F_{si} = \left( \sum_{k=1}^{k_i} \omega_{sk}^i \left( \sum_{t=1}^{M} \delta_{k1}^i \alpha_{kt}^i x_{st} \right), \ldots, \sum_{k=1}^{K} \omega_{sk}^i \left( \sum_{t=1}^{M} \delta_{kC}^i \alpha_{kt}^i x_{st} \right) \right)$$

$$= \sum_{t=1}^{M} \alpha_{kt}^i x_{st} (\omega_{s1}^i, \omega_{s2}^i, \ldots, \omega_{sK}^i) \begin{pmatrix} \delta_{11}^i & \cdots & \delta_{1C}^i \\ \vdots & \ddots & \vdots \\ \delta_{K1}^i & \cdots & \delta_{KC}^i \end{pmatrix}$$

Where s=1, 2, ..., N, then, for all training samples X, the output of the i-th fuzzy subsystem is:

$$F_i = (F_{1i}, F_{2i}, \ldots, F_{Ni})^T \triangleq D\Omega^i \delta^i \in \mathbb{R}^{N \times C}$$

Where $D = \text{diag}\left\{ \sum_{t=1}^{M} \alpha_{kt}^i x_{1t}, \ldots, \sum_{t=1}^{M} \alpha_{kt}^i x_{Nt} \right\}$, $$\Omega^i = \begin{pmatrix} \omega_{11}^i & \cdots & \omega_{1K}^i \\ \vdots & \ddots & \vdots \\ \omega_{N1}^i & \cdots & \omega_{NK}^i \end{pmatrix}, \delta^i = \begin{pmatrix} \delta_{11}^i & \cdots & \delta_{1C}^i \\ \vdots & \ddots & \vdots \\ \delta_{K1}^i & \cdots & \delta_{KC}^i \end{pmatrix}$$

Thus, the output of n fuzzy subsystems can be obtained:

$$F^n = \sum_{i=1}^{n} F_i = \sum_{i=1}^{n} D\Omega^i \delta^i = D(\Omega^1, \Omega^2, \ldots, \Omega^n) \begin{pmatrix} \delta^1 \\ \vdots \\ \delta^n \end{pmatrix} = D\Omega\Delta \in \mathbb{R}^{N \times C}$$

Wherein, $\Omega = (\Omega^1, \Omega^2, \ldots, \Omega^n) \in \mathbb{R}^{N \times nk}$ is the matrix containing the weighted strengthen $\omega_{sk}^i$ obtained in 3). $\Delta = ((\delta^1)^T, \ldots, (\delta^n)^T)^T \in \mathbb{R}^{nK \times C}$ 7) Calculate the final output result. Weight between fuzzy subsystem and output is set to 1, and the weight between enhanced node group and output is set to $W_e \in \mathbb{R}^{(L_1+L_2+\ldots L_m) \times C}$. Multiply the $H^m$ obtained in 4) and $F^n$ obtained in 5) respectively. The weights are then summed to get the final output result, the formula is as follows:

$$\hat{Y} = F^n + H^m W_e = D\Omega\Delta + H^m W_e = (D\Omega, H^m)\begin{pmatrix} \Delta \\ W_e \end{pmatrix} \triangleq \Delta(D\Omega, H^m)W$$

For a given training target Y, the matrix W can be calculated by pseudo-inverse:

$$W = (D\Omega, H^m)^+ Y$$

Wherein, so far, the network model training is complete.

B Online Monitoring:

8) During online monitoring, set the new data $X_{new} = (x_{new,1}, x_{new,2}, \ldots, x_{new,N})^T \in \mathbb{R}^{N \times M}$, $X_{new,s} = (X_{new,1}, X_{new,2}, \ldots, X_{new,M})$, s=1, 2, ..., N. For n fuzzy subsystems in the training part, taking i-th subsystem as an example, using first-order T-S fuzzy system, then:

$$z_{new,ski}^i = f_k^i(x_{new,s1}, x_{new,s2}, \ldots, x_{new,sM}) = \sum_{t=1}^{M} \alpha_{kt}^i x_{new,st}$$

The value of $\alpha_{kt}^i$ is the value corresponding to the training part.

9) For s-th test sample, the weighted strength of i-th fuzzy subsystem is as follows:

$$\omega_{new,sk}^i = \frac{\tau_{new,sk}^i}{\sum_{k=1}^{K} \tau_{new,sk}^i}$$

Where $\tau_{new,sk}^i$ represents the strength of k-th fuzzy rule of i-th fuzzy subsystem, which is obtained by the following formula:

$$\tau_{new,sk}^i = \prod_{t=1}^{M} \mu_{kt}^i(x_{new,st})$$

Where $\mu_{kt}^i(x_{new,st})$ is the Gaussian membership function corresponding to the input sample $X_{new,st}$ (t=1, 2, ..., M), and its formula is expressed as:

$$\mu_{kt}^i(x_{new,st}) = e^{-\left(\frac{x_{new,st} - c_{kt}^i}{\delta_{kt}^i}\right)^2}$$

Wherein, $c_{kt}^i$ and $\delta_{kt}^i$ are parameters, and their values are the same as corresponding parameter values of the training part.

10) For all test samples, find the output $Z_{new}^n$ of n fuzzy subsystems. The formula is as follows:

$$Z_{new}^n = (Z_{new1}, Z_{new2}, \ldots, Z_{newn}) \in \mathbb{R}^{N \times nK}$$

The output $Z_{newi}$ of i-th fuzzy subsystem can be expressed as follows:

$$Z_{newi} = (Z_{new,1i}, Z_{new,2i}, \ldots, Z_{new,Ni})^T \in \mathbb{R}^{N \times K}, i=1, 2, \ldots, n$$

Taking s-th training sample among all N samples as an example, the output vector $Z_{new,si}$ of i-th fuzzy subsystem can be expressed as:

$$Z_{new,si} = (\omega_{new,s1}^i z_{new,s1}^i, \omega_{new,s2}^i z_{new,s2}^i, \ldots, \omega_{new,sK}^i z_{newsK}^i)$$

Where (s=1, 2, ..., N)

Wherein, $z_{new,sk}^i$ and $\omega_{new,sk}^i$ are obtained by 8) and 9) respectively, k=1, 2, ..., K.

11) The output $Z_{new}^n$ obtained in 10) is subjected to nonlinear conversion.

Then for m enhanced node groups, the output matrix of enhanced layer can be expressed as:

$$H_{new}^m = (H_{new1}, H_{new2}, \ldots, H_{newm}) \in \mathbb{R}^{N \times (L_1 + L_2 + \ldots L_m)}$$

Where $H_{newj} = \xi_j(Z_{new}^n W_j + \beta_j) \in \mathbb{R}^{N \times L_j}$ is the output matrix of j-th enhanced node group (j=1, 2, ..., m), and the values of Wj and βj correspond to the network training part.

12) Calculate the defuzzification output of fuzzy subsystem.

After introducing parameter $\delta_{kc}^i$ to the result part of each fuzzy rule, c=1, 2, ..., C. For s-th training sample, defuzzification output vector of i-th fuzzy subsystem can be expressed as:

$$F_{newsi} = \left(\sum_{k=1}^{K_i} \omega_{sk}^i \left(\sum_{t=1}^{M} \delta_{k1}^i \alpha_{kt}^i x_{newst}\right) \ldots \sum_{k=1}^{K_i} \omega_{sk}^i \left(\sum_{t=1}^{M} \delta_{kC}^i \alpha_{kt}^i x_{newst}\right)\right)$$

$$= \sum_{t=1}^{M} \alpha_{kt}^i x_{newst}(\omega_{s1}^i, \omega_{s2}^i, \ldots, \omega_{sK}^i) \begin{pmatrix} \delta_{11}^i & \cdots & \delta_{1C}^i \\ \vdots & \ddots & \vdots \\ \delta_{K1}^i & \cdots & \delta_{KC}^i \end{pmatrix}$$

Then, for all training samples X, the output of i-th fuzzy subsystem is:

$$F_{newi} = (F_{new,1i}, F_{new,2i}, \ldots, F_{new,Ni})^T \triangleq D_{new} \Omega_{new}^i \delta^i \in \mathbb{R}^{N \times C}$$

Wherein $D_{new} = diag\left\{\sum_{t=1}^{M} \alpha_{kt}^i x_{new,1t}, \ldots, \sum_{t=1}^{M} \alpha_{kt}^i x_{new,Nt}\right\}$, $$\Omega_{new}^i = \begin{pmatrix} \omega_{new,11}^i & \cdots & \omega_{new1,K}^i \\ \vdots & \ddots & \vdots \\ \omega_{new,N1}^i & \cdots & \omega_{new,NK}^i \end{pmatrix}, \delta^i = \begin{pmatrix} \delta_{11}^i & \cdots & \delta_{1C}^i \\ \vdots & \ddots & \vdots \\ \delta_{K1}^i & \cdots & \delta_{KC}^i \end{pmatrix}$$

Thus, the output of n fuzzy subsystems can be obtained:

$$F_{new}^n = \sum_{i=1}^{n} F_{newi} = \sum_{i=1}^{n} D_{new} \Omega_{new}^i \delta^i = D_{new}(\Omega_{new}^1, \ldots, \Omega_{new}^n) \begin{pmatrix} \delta^1 \\ \vdots \\ \delta^n \end{pmatrix} = D_{new} \Omega_{new} \Delta \in \mathbb{R}^{N \times C}$$

Wherein, $\Omega_{new} = (\Omega_{new}^1, \ldots, \Omega_{new}^n) \in \mathbb{R}^{N \times nK}$ is the matrix containing weighted strength $\omega_{new,sk}^i$ obtained in 9).

$$\Delta = ((\delta^1)^T, \ldots, (\delta^n)^T)^T \in \mathbb{R}^{nK \times C}$$

13) Calculate the final output value. Set the weight between combined output of connection enhancement node to $W_e \in \mathbb{R}^{(L_1 + L_2 + \ldots L_m) \times C}$ whose value is obtained from training phase, and the weight between fuzzy subsystem and output is 1, multiply $H_{new}^m$ obtained from 11) and $F_{new}^n$ obtained from 12) by their respective weights, and then sum them to get final output.

The formula is as follows:

$$\hat{Y} = F_{new}^n + H_{new}^m W_e \triangleq (D_{new} \Omega_{new}, H_{new}^m) W$$

The value of W corresponds to the value of parameter matrix of network training part.

$$(D_{new}\Omega_{new}, H_{new}^m)^+ = ((D_{new}\Omega_{new}, H_{new}^m)^T (D_{new}\Omega_{new}, H_{new}^m))^{-1}(D_{new}\Omega_{new}, H_{new}^m)^T$$

14) The output value $\hat{Y}$ is converted to zero by one-hot encoding method. When it is 0, it means that the operation is in a normal state. When the output value is 1, it means that the operation is faulty, so as to realize fault monitoring.

Beneficial Effect

The present invention uses the historical data of sewage treatment process to train the network model. When training the model, normal process data is labeled as 0 and the fault period data is labeled as 1, the network parameters obtained by training are used for online fault monitoring.

Compared with current popular deep network, the present invention only needs to increase the number of enhanced nodes and can be reconstructed in an incremental manner without retraining the entire network from scratch. On the premise of ensuring that the accuracy meets the requirements, the present invention continuously and rapidly adjusts itself as the production process changes, realizes timely online faults monitoring of sewage treatment process, and obtains good monitoring results.

PREFERRED EMBODIMENT

Figure 1:
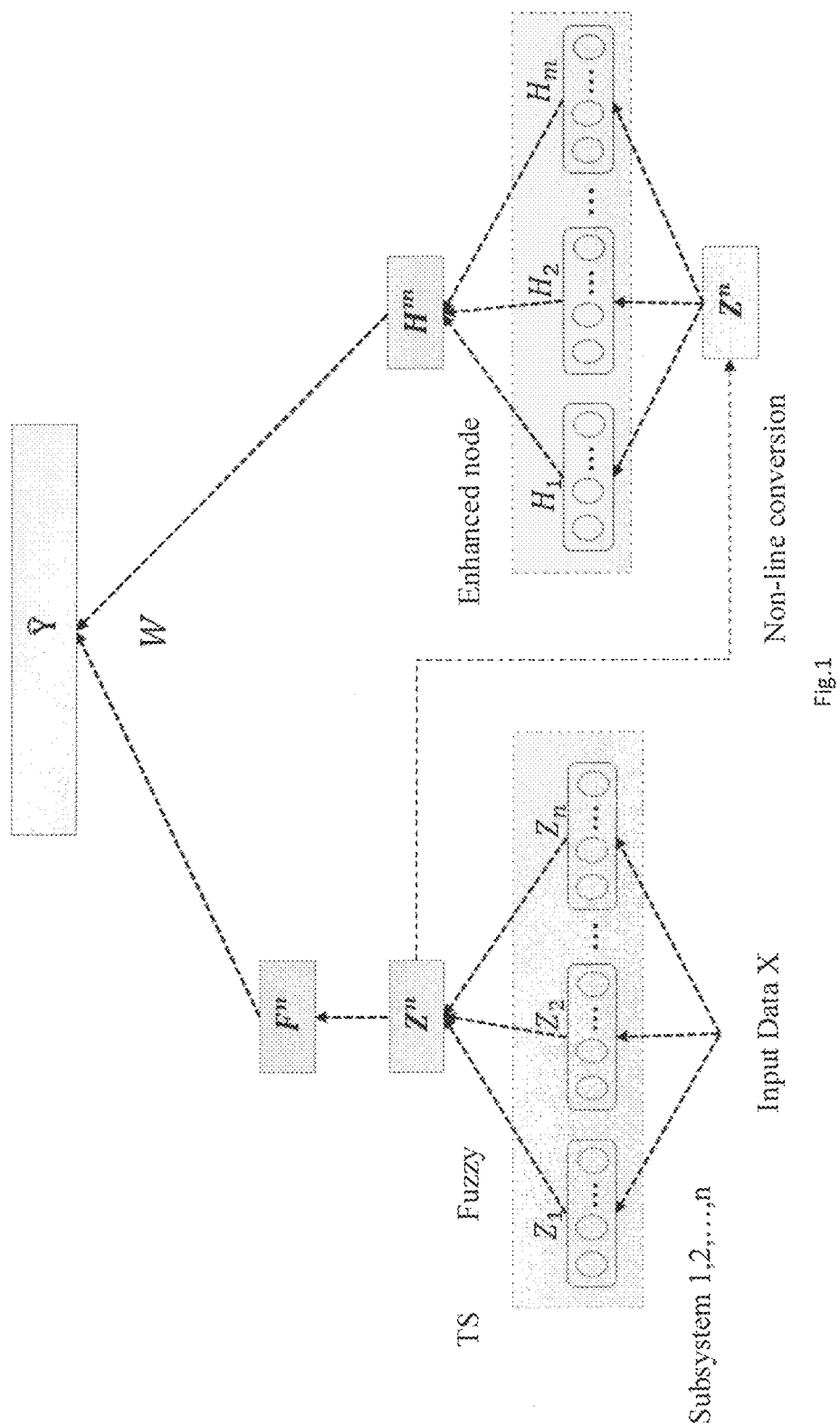
FIG. 1 is a diagram of the overall structure of the present invention.
Figure 2:
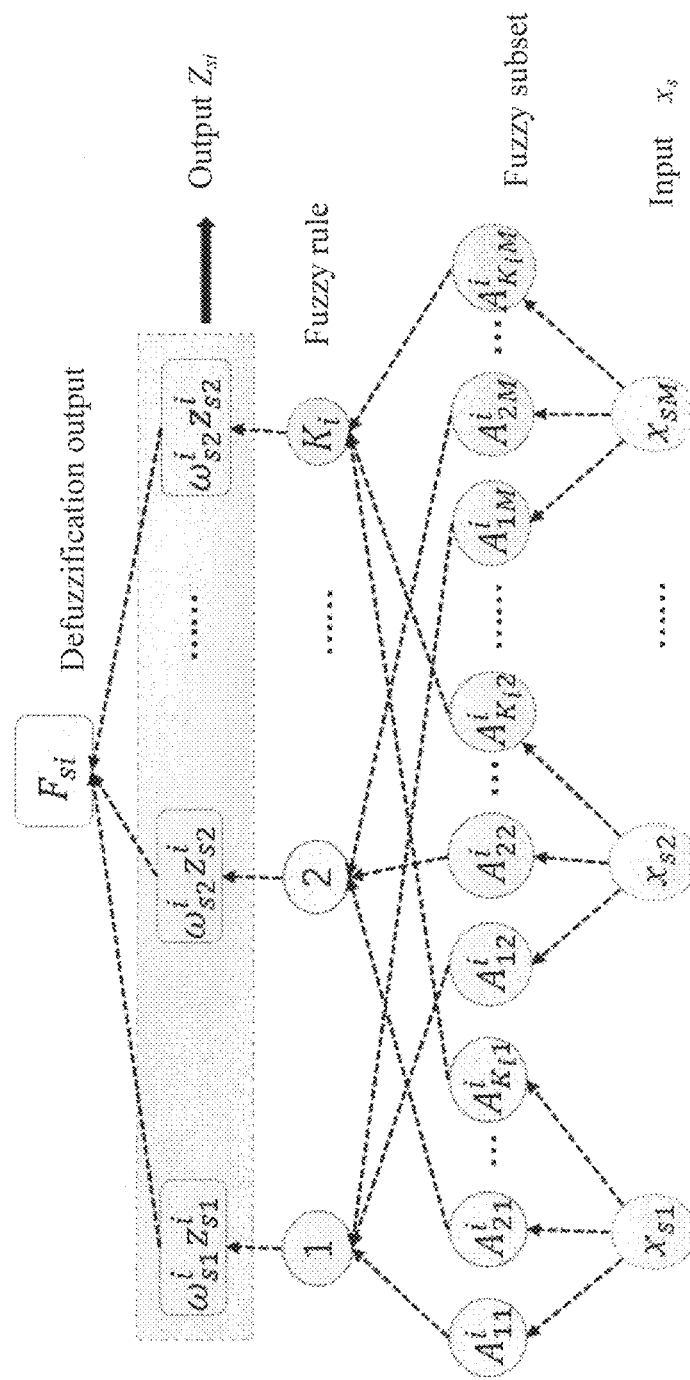
FIG. 2 is a structural diagram of i-th fuzzy subsystem of the present invention.

In order to solve the above-mentioned problems, a fault monitoring method of sewage treatment process based on fuzzy width adaptive learning model is proposed, which is based on an online monitoring equipment. The whole device includes input module, information processing module, console module, output result visualization module. The proposed method is imported into the information processing module, and then the network monitoring model is established with the process data retained by the actual industry, and the established model is saved for online fault monitoring. In actual online monitoring of industrial processes, first connect real-time process variables collected by the factory data sensor to input module as the input information of monitoring equipment, and then select previously trained model through console to monitor, and the monitoring results is displayed in real time through visualization module, so that on-site staff can make timely corresponding measures based on visualization monitoring results to reduce the economic loss caused by process failures.

The sewage treatment process is extremely complex, including not only a variety of physics and chemistry, but also biochemical reactions. In addition, various uncertain factors are flooded with it, such as influent flow, water quality and load changes, which give huge challenges for establishment of sewage treatment monitoring model. The present invention uses the "benchmark simulation model 1" (benchmark simulation model 1) developed by the International Water Association (IWA) as the actual sewage treatment process for real-time simulation. The model consists of five reaction tanks (5999 m$^3$) and a secondary settling tank (6000 m$^3$), in addition, it has three aeration tanks. The aeration tank has 10 layers, 4 meters deep, and covers an area of 1500 m$^2$. The reaction process includes internal and external reflux. The average sewage treatment flow rate is 20 000 m$^3$/d, and the chemical oxygen demand is 300 mg/l.

This experiment takes BSM1 sewage data as the research object, the sampling interval is 15 minutes, and the sampling period is 14 days. That is, there are 96 sampling points every day, totaling 1344 sampling points. Select 16 variables to monitor the operating status of the process, as shown in Table 1. A batch of normal data and 4 batches of fault data are used as training data to train the network offline, and 4 batches of fault data are used as test data to verify the effectiveness of the method. Set the fault types of two types of faults under rainy conditions: single fault and compound fault. The fault occurrence time is both the eighth day and the ninth day. The detailed information of the fault is shown in Table 2.

TABLE 1

Sewage variables

| Number | Name of Variables | Unit |
|---|---|---|
| 1 | Discharge flux | m−3 · d |
| 2 | Discharge concentration | SI g COD · m$^{-3}$ |
| 3 | Discharge concentration | SS g COD · m$^{-3}$ |
| 4 | Discharge concentration | XI g COD · m$^{-3}$ |
| 5 | Discharge concentration | XS g COD · m$^{-3}$ |
| 6 | Discharge concentration | XBH g COD · m$^{-3}$ |
| 7 | Discharge concentration | XBA g COD · m$^{-3}$ |
| 8 | Discharge concentration | XP g COD · m$^{-3}$ |
| 9 | Discharge concentration | SO g (-COD) · m$^{-3}$ |
| 10 | Discharge concentration | SNO g N · m$^{-3}$ |
| 11 | Discharge concentration | SNH g N · m$^{-3}$ |
| 12 | Discharge concentration | SND g N · m$^{-3}$ |
| 13 | Discharge concentration | XND g N · m$^{-3}$ |
| 14 | Discharge concentration | SALK mol HCO3− · m$^{-3}$ |
| 15 | Discharge concentration | TSS g SS · m$^{-3}$ |
| 16 | Discharge Kjeldahl concentration | N g N · m$^{-3}$ |

TABLE 2

Failure data settings

| Failure code | Working condition | Amplitude | Failure type | Starting time | Ending time |
|---|---|---|---|---|---|
| 1 | Rainy | Muh = 3.5 | Single | 673 | 864 |
| 2 | Rainy | Muh = 1 | Single | 673 | 864 |
| 3 | Rainy | Muh = 2 BH = 0.45 | Compound | 673 | 864 |
| 4 | Rainy | Muh = 2 BH = 0.6 | Compound | 673 | 864 |

The fault monitoring process of the application of the present invention in the above-mentioned BSM1 sewage treatment process is specifically stated as follows:

A. Network Training Stage:

Step 1: Collect a batch of operating data under normal working conditions and 4 batches of fault data as a training data $X \in \mathbb{R}^{N \times M}$ set through BSM1 platform. Each batch of data samples has 1344 points, 16 variables. Take five sets of data as a training data set. It can be expressed as X (6720×16), label the data, the label value is 0 at normal time, and the label value at fault time is 1, which is represented as Y (6720×2).

Step 2: The number of fuzzy subsystems, enhanced node groups, and fuzzy rules of each fuzzy subsystem are determined according to the actual situation. The model in this embodiment contains n=8 fuzzy subsystems, m=10 enhanced node groups, and each group contains 10 neurons. The number of fuzzy rules for each fuzzy subsystem is 5, and the first-order T-S is adopted. Fuzzy model, taking the i-th fuzzy subsystem as an example (i=1, 2, . . . , n), when the input data is s-th training sample, the output of k-th fuzzy rule of i-th fuzzy subsystem is:

$$z_{sk}^i = f_k^i(x_{s1}, x_{s2}, \ldots, x_{sM}) = \sum_{t=1}^{M} \alpha_{kt}^i x_{st}$$

Wherein, $f_k^i$ is a polynomial of the first degree, $\alpha_{kt}^i$ is a parameter, obeys uniform distribution [0,1], t=1, 2, . . . , M, k=1, 2, . . . , K represents the number of variables.

Step 3: For the s-th training sample, calculate weighted strength $\omega_{sk}^i$ of k-th fuzzy rule of the i-th fuzzy subsystem:

$$\omega_{sk}^i = \frac{\tau_{sk}^i}{\sum_{k=1}^{k_i} \tau_{sk}^i}$$

Where $\tau_{sk}^i$ represents weighted strength of the kth fuzzy rule of i-th fuzzy subsystem (k=1, 2, . . . , K) when the input training sample is Xs (xs=(xs1, xs2, . . . , xsM)), the formula is as follows:

$$\tau_{sk}^i = \prod_{t=1}^{M} \mu_{kt}^i(x_{st})$$

Where $\mu_{kt}^i(x_{st})$ is the Gaussian membership function (t=1, 2, . . . , M) corresponding to the input sample $X_{st}$, and its formula is expressed as:

$$\mu_{st}^i(x_{st}) = e^{-\left(\frac{x_{st}-c_{kt}^i}{\delta_{kt}^i}\right)^2}$$

Wherein $c_{kt}^i$ and $\delta_{kt}^i$ are parameters, and the value of $c_{kt}^i$ is the value of cluster center obtained by C-means clustering, $\delta_{kt}^i=1$ Step 4: Calculate the output $Z^n$ of n fuzzy subsystems corresponding to sth training sample:

$$Z^n = (Z_1, Z_2, \ldots, Z_n) \in \mathbb{R}^{N \times (k_1+k_2+\ldots k_n)}$$

Wherein, $Z_1, Z_2, \ldots, Z_1$ respectively correspond to the output of n subsystems, $k_1, k_2, \ldots, k_n$ respectively correspond to the number of fuzzy rules of n fuzzy subsystems, and the sth training sample.

Taking i-th fuzzy subsystem as an example, for all training samples, the output matrix $Z_i$ is obtained by the following formula:

$$Z_i = (Z_{1i}, Z_{2i}, \ldots, Z_{Ni})^T \in \mathbb{R}^{N \times K}, i=1,2,\ldots,n$$

Wherein, $Z_{1i}, Z_{2i}, \ldots, Z_{Ni}$ respectively represent the output vector of i-th fuzzy subsystem for N training samples. Taking s-th sample as an example, the output vector of i-th fuzzy subsystem can be obtained by the following formula:

$$Z_{si} = (\omega_{s1}^i z_{s1}^i, \omega_{s2}^i z_{s2}^i, \ldots, \omega_{sk_1}^i z_{sk_1}^i)$$

Wherein, $z_{sk}^i$ and $\omega_{sk}^i$ are obtained by 2) and 3) respectively, and k=1, 2, . . . , K.

Step 5: Input the output $Z^n$ obtained in step 4 into m enhanced node groups mentioned in step 2 for nonlinear conversion. Wherein, the j-th enhanced node group has Lj neurons (=1, 2, . . . , m). For m enhanced node groups, the output matrix can be expressed as:

$$H^m = (H_1, H_2, \ldots, H_m) \in \mathbb{R}^{N \times (L_1+L_2+\ldots L_m)}$$

Wherein, $L_1, L_2, \ldots, L_m$ respectively represent the number of neurons contained in m enhanced node groups, $H_j = \xi_j(Z^n W_j + \beta_j) \in \mathbb{R}^{N \times L_j}$ is the output matrix of j-th enhanced node group, and Wj represents connection weight between fuzzy subsystem output and the corresponding enhanced node group, βj represents the deviation between output of fuzzy subsystem and j-th enhanced node group, the values of Wj and βj are randomly generated from [0,1], ξj is the activation function, and the formula is ξj=tan h(.).

Step 6: Calculate the defuzzification output of fuzzy subsystem. Then for s-th training sample $X_s$, the defuzzification output vector of i-th fuzzy subsystem can be expressed as:

$$F_{si} = \sum_{k=1}^{k_i} \omega_{sk}^i z_{sk}^i = \sum_{k=1}^{k_i} \left( \omega_{sk}^i \sum_{t=1}^{M} \alpha_{kt}^i x_{st} \right)$$

Introduce parameter $\delta_{kc}^i$ to the result part of each fuzzy rule. The parameter value is obtained by pseudo-inverse operation method, and C represents dimension of output. Since $Y = \in \mathbb{R}^{N \times C}$ has C dimensions, each fuzzy subsystem is a multi-output model. After the parameter is introduced, its new output is:

$$F_{si} = \left( \sum_{k=1}^{k_i} \omega_{sk}^i \left( \sum_{t=1}^{M} \delta_{k1}^i \alpha_{kt}^i x_{st} \right), \ldots, \sum_{k=1}^{K} \omega_{sk}^i \left( \sum_{t=1}^{M} \delta_{kC}^i \alpha_{kt}^i x_{st} \right) \right)$$

$$= \sum_{t=1}^{M} \alpha_{kt}^i x_{st}(\omega_{s1}^i, \omega_{s2}^i, \ldots, \omega_{sK}^i) \begin{pmatrix} \delta_{11}^i & \cdots & \delta_{1C}^i \\ \vdots & \ddots & \vdots \\ \delta_{K1}^i & \cdots & \delta_{KC}^i \end{pmatrix}$$

Where s=1, 2, . . . , N, then, for all training samples X, the output of the i-th fuzzy subsystem is:

$$F_i = (F_{1i}, F_{2i}, \ldots, F_{Ni})^T \triangleq D\Omega^i \delta^i \in \mathbb{R}^{N \times C}$$

Where $D = diag\left\{ \sum_{t=1}^{M} \alpha_{kt}^i x_{1t}, \ldots, \sum_{t=1}^{M} \alpha_{kt}^i x_{Nt} \right\}$, $$\Omega^i = \begin{pmatrix} \omega_{11}^i & \cdots & \omega_{1K}^i \\ \vdots & \ddots & \vdots \\ \omega_{N1}^i & \cdots & \omega_{NK}^i \end{pmatrix}, \delta^i = \begin{pmatrix} \delta_{11}^i & \cdots & \delta_{1C}^i \\ \vdots & \ddots & \vdots \\ \delta_{K1}^i & \cdots & \delta_{KC}^i \end{pmatrix}$$

Thus, the output of n fuzzy subsystems can be obtained:

$$F^n = \sum_{i=1}^{n} F_i = \sum_{i=1}^{n} D\Omega^i \delta^i = D(\Omega^1, \Omega^2, \ldots, \Omega^n) \begin{pmatrix} \delta^1 \\ \vdots \\ \delta^n \end{pmatrix} = D\Omega\Delta \in \mathbb{R}^{N \times C}$$

Wherein, $\Omega = (\Omega^1, \Omega^2, \ldots, \Omega^n) \in \mathbb{R}^{N \times nk}$ is the matrix containing the weighted strengthen $\omega_{sk}^i$ obtained in 3). $\Delta = ((\delta^1)^T, \ldots, (\delta^n)^T)^T \in \mathbb{R}^{nK \times C}$.

Step 7: Calculate the final output result. Weight between fuzzy subsystem and output is set to 1, and the weight between enhanced node group and output is set to $W_e \in \mathbb{R}^{(L_1+L_2+\ldots L_m) \times C}$. Multiply the $H^m$ obtained in 4) and $F^n$ obtained in 5) respectively. The weights are then summed to get the final output result, the formula is as follows:

$$\hat{Y} = F^n + H^m W_e = D\Omega\Delta + H^m W_e = (D\Omega, H^m)\begin{pmatrix} \Delta \\ W_e \end{pmatrix} \triangleq (D\Omega, H^m)W$$

For a given training target Y, the matrix W can be calculated by pseudo-inverse:

$$W = (D\Omega, H^m)^+ Y$$

Wherein, so far, the network model training is complete.

B Online Monitoring:

Step 8: During online monitoring, set the new data $X_{new}=(x_{new,1}, x_{new,2}, \ldots, x_{new,N})^T \in \mathbb{R}^{N \times M}$, $X_{new,s}=(X_{new,1}, X_{new,2}, \ldots, X_{new,M})$, $s=1, 2, \ldots, N$. For n fuzzy subsystems in the training part, taking i-th subsystem as an example, using first-order T-S fuzzy system, then:

$$z_{new,sk}^i = f_k^i(x_{new,s1}, x_{new,s2}, \ldots, x_{new,sM}) = \sum_{t=1}^{M} \alpha_{kt}^i x_{new,st}$$

The value of $\alpha_{kt}^i$ is the value corresponding to the training part.

Step 9: For s-th test sample, the weighted strength of i-th fuzzy subsystem is as follows:

$$\omega_{new,sk}^i = \frac{\tau_{new,sk}^i}{\sum_{k=1}^{K} \tau_{new,sk}^i}$$

Where $\tau_{new,sk}^i$ represents the strength of k-th fuzzy rule of i-th fuzzy subsystem, which is obtained by the following formula:

$$\tau_{new,sk}^i = \prod_{t=1}^{M} \mu_{kt}^i(x_{new,st})$$

Where $\mu_{kt}^i(x_{new,st})$ is the Gaussian membership function corresponding to the input sample $X_{new,st}$ ($t=1, 2, \ldots, M$), and its formula is expressed as:

$$\mu_{kt}^i(x_{new,st}) = e^{-\left(\frac{x_{new,st} - c_{kt}^i}{\delta_{kt}^i}\right)^2}$$

Wherein, $c_{kt}^i$ and $\delta_{kt}^i$ are parameters, and their values are the same as corresponding parameter values of the training part.

Step 10: For all test samples, find the output $Z_{new}^n$ of n fuzzy subsystems. The formula is as follows:

$$Z_{new}^n = (Z_{new1}, Z_{new2}, \ldots, Z_{newn}) \in \mathbb{R}^{N \times nK}$$

The output $Z_{newi}$ of i-th fuzzy subsystem can be expressed as follows:

$$Z_{newi} = (Z_{new,1i}, Z_{new,2i}, \ldots, Z_{new,Ni})^T \in \mathbb{R}^{N \times K}, i=1, 2, \ldots, n$$

Taking s-th training sample among all N samples as an example, the output vector $Z_{new,si}$ of i-th fuzzy subsystem can be expressed as:

$$Z_{new,si} = (\omega_{new,s1}^i z_{new,s1}^i, \omega_{new,s2}^i z_{new,s2}^i, \ldots, \omega_{new,sK}^i z_{new,sK}^i)$$

Where $(s=1, 2, \ldots, N)$

Wherein, $Z_{new,sk}^i$ and $\omega_{new,sk}^i$ are obtained by 8) and 9) respectively, $k=1, 2, \ldots, K$.

Step 11: The output $Z_{new}^n$ obtained in 10) is subjected to nonlinear conversion.

Then for m enhanced node groups, the output matrix of enhanced layer can be expressed as:

$$H_{new}^m = (H_{new1}, H_{new2}, \ldots, H_{newm}) \in \mathbb{R}^{N \times (L_1+L_2+\ldots L_m)}$$

Where $H_{newj} = \xi_j(Z_{new}^n W_j + \beta_j) \in \mathbb{R}^{N \times L_j}$ is the output matrix of j-th enhanced node group ($j=1, 2, \ldots, m$), and the values of Wj and βj correspond to the network training part.

Step 12: Calculate the defuzzification output of fuzzy subsystem.

After introducing parameter $\delta_{kc}^i$ to the result part of each fuzzy rule, $c=1, 2, \ldots, C$. For s-th training sample, defuzzification output vector of i-th fuzzy subsystem can be expressed as:

$$F_{newsi} = \left(\sum_{k=1}^{K_i} \omega_{sk}^i \left(\sum_{t=1}^{M} \delta_{k1}^i \alpha_{kt}^i x_{newst}\right) \ldots \sum_{k=1}^{K_i} \omega_{sk}^i \left(\sum_{t=1}^{M} \delta_{kC}^i \alpha_{kt}^i x_{newst}\right)\right)$$

$$= \sum_{t=1}^{M} \alpha_{kt}^i x_{newst}(\omega_{s1}^i, \omega_{s2}^i, \ldots, \omega_{sK}^i) \begin{pmatrix} \delta_{11}^i & \cdots & \delta_{1C}^i \\ \vdots & \ddots & \vdots \\ \delta_{K1}^i & \cdots & \delta_{KC}^i \end{pmatrix}$$

Then, for all training samples X, the output of i-th fuzzy subsystem is:

$$F_{newi} = (F_{new,1i}, F_{new,2i}, \ldots, F_{new,Ni})^T \triangleq D_{new}\Omega_{new}^i \delta^i \in \mathbb{R}^{N \times C}$$

Wherein $D_{new} = diag\left\{\sum_{t=1}^{M} \alpha_{kt}^i x_{new,1t}, \ldots, \sum_{t=1}^{M} \alpha_{kt}^i x_{new,Nt}\right\}$, $$\Omega_{new}^i = \begin{pmatrix} \omega_{new,11}^i & \cdots & \omega_{new1,K}^i \\ \vdots & \ddots & \vdots \\ \omega_{new,N1}^i & \cdots & \omega_{new,NK}^i \end{pmatrix}, \delta^i = \begin{pmatrix} \delta_{11}^i & \cdots & \delta_{1C}^i \\ \vdots & \ddots & \vdots \\ \delta_{K1}^i & \cdots & \delta_{KC}^i \end{pmatrix}$$

Thus, the output of n fuzzy subsystems can be obtained:

$$F_{new}^n = \sum_{i=1}^{n} F_{newi} =$$

$$\sum_{i=1}^{n} D_{new}\Omega_{new}^i \delta^i = D_{new}(\Omega_{new}^1, \ldots, \Omega_{new}^n)\begin{pmatrix} \delta^1 \\ \vdots \\ \delta^n \end{pmatrix} = D_{new}\Omega_{new}\Delta \in \mathbb{R}^{N \times C}$$

Wherein, $\Omega_{new} = (\Omega_{new}^1, \ldots, \Omega_{new}^n) \in \mathbb{R}^{N \times nK}$ is the matrix containing weighted strength $\omega_{new,sk}^i$ obtained in 9).

$$\Delta = ((\delta^1)^T, \ldots, (\delta^n)^T)^T \in \mathbb{R}^{nK \times C}$$

Step 13: Calculate the final output value. Set the weight between combined output of connection enhancement node to $W_e \in \mathbb{R}^{(L_1+L_2+\ldots L_m) \times C}$ whose value is obtained from training phase, and the weight between fuzzy subsystem and output is 1, multiply $H_{new}^m$ obtained from step 11 and $F_{new}^n$ obtained from step 12 by their respective weights, and then sum them to get final output. The formula is as follows:

$$\hat{Y}=F_{new}^n+H_{new}^m W_e \triangleq (D_{new},\Omega_{new},H_{new}^m)W$$

The value of W corresponds to the value of parameter matrix of network training part.

$$(D_{new},\Omega_{new},H_{new}^m)_+=((D_{new},\Omega_{new},H_{new}^m)^T(D_{new},\Omega_{new},H_{new}^m))^{-1}(D_{new},\Omega_{new},H_{new}^m)^T$$

Step 14: The output value $\hat{Y}$ is converted to zero by one-hot encoding method. When it is 0, it means that the operation is in a normal state. When the output value is 1, it means that the operation is faulty, so as to realize fault monitoring.

The above steps are specific application of the method of the present invention in fault monitoring of the sewage treatment process of BSM1 platform. In the experiment, two types of faults under sunny and dry weather conditions are used, namely single fault and compound fault, and the fault occurrence time is both on the eighth and ninth days. The experimental results are shown in FIG. 3 to FIG. 6. Abscissa of each picture represents the sampling point, and the ordinate is the output result, showing a judgment of 0, 1, where 0 means normal operation and 1 means malfunction. The performance indicators are false alarm rate (FAR), missed alarm rate (MAR) and accuracy rate (ACC), among which:

FAR=The number of false alarm/total normal time*100%

MAR=The number of missed alarm/total failure time*100%

ACC=(The number of false alarm+The number of missed alarm)/total sampling time*100%

Unilateral consideration of false alarm rate (FAR) or missed alarm rate (MAR) cannot fully reflect the quality of monitoring performance. Therefore, the false alarm rate (FAR) or missed alarm rate (MAR) shall be considered comprehensively. When the false alarm rate (When FAR and MAR are both low, that is, when the accuracy rate (ACC) is low, the monitoring performance is considered better.

Figure 3:
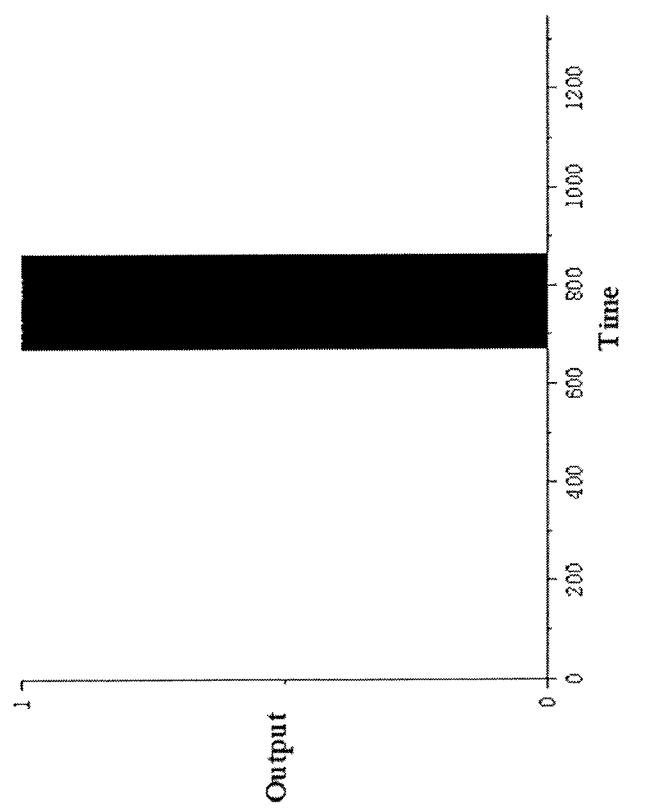
FIG. 3 shows the monitoring result of fault 1.
Figure 4:
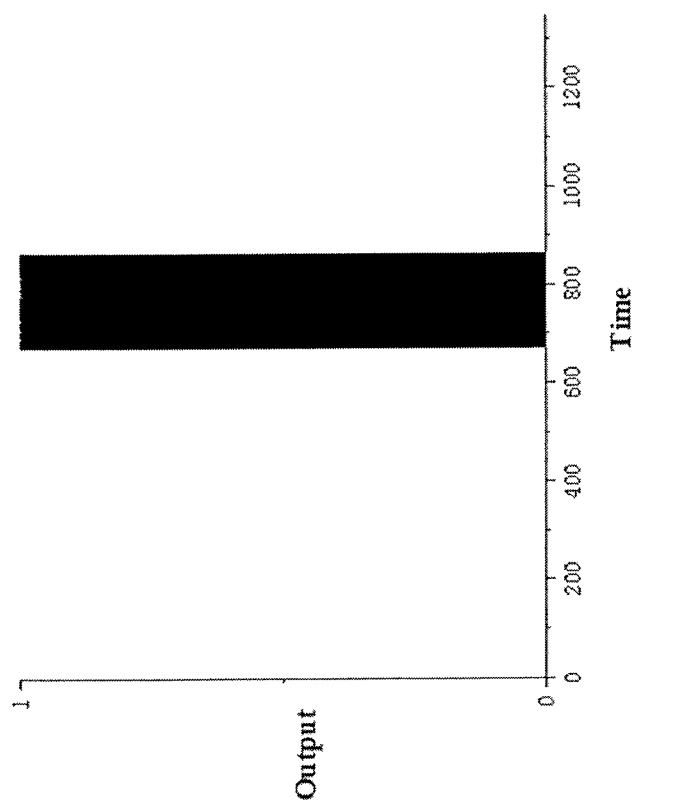
FIG. 4 shows the monitoring results of fault 2.
Figure 5:
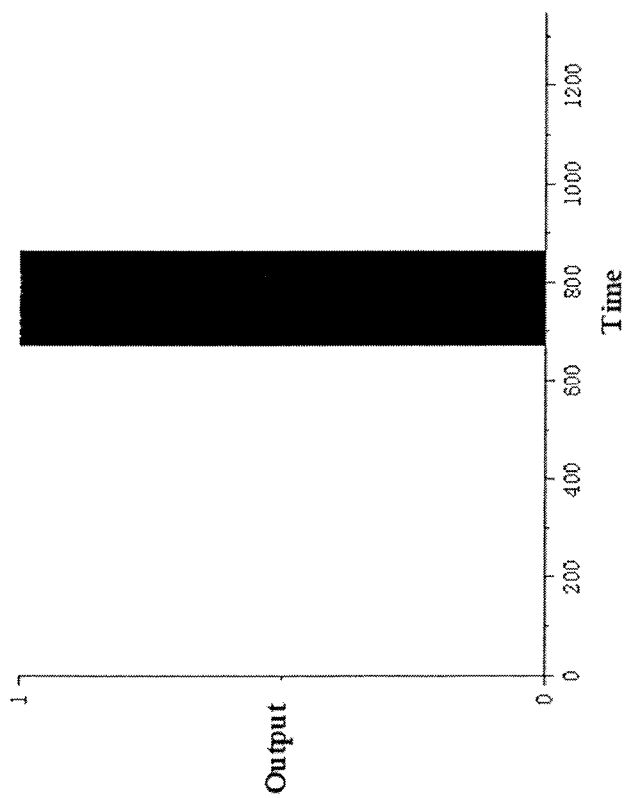
FIG. 5 shows the monitoring results of fault 3.
Figure 6:
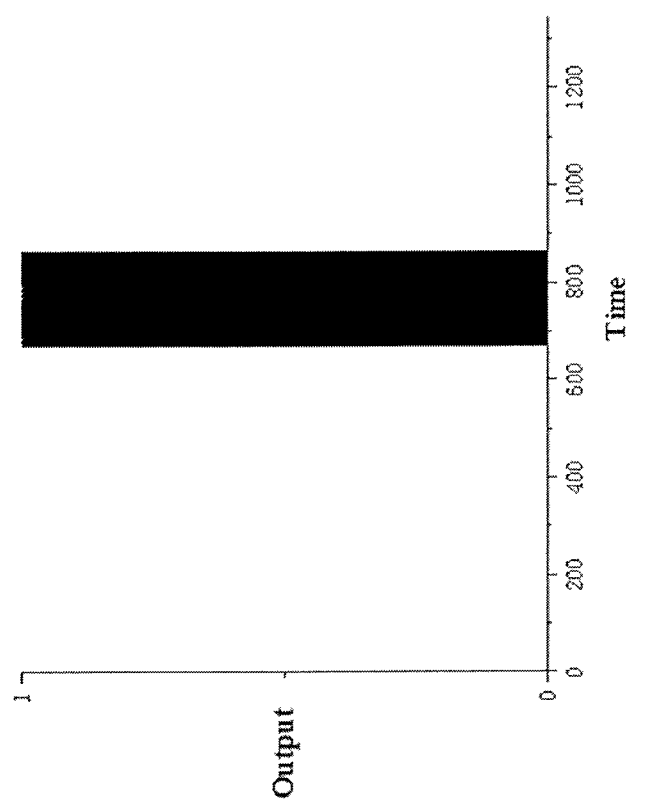
FIG. 6 shows the monitoring results of fault 4.
Figure 7:
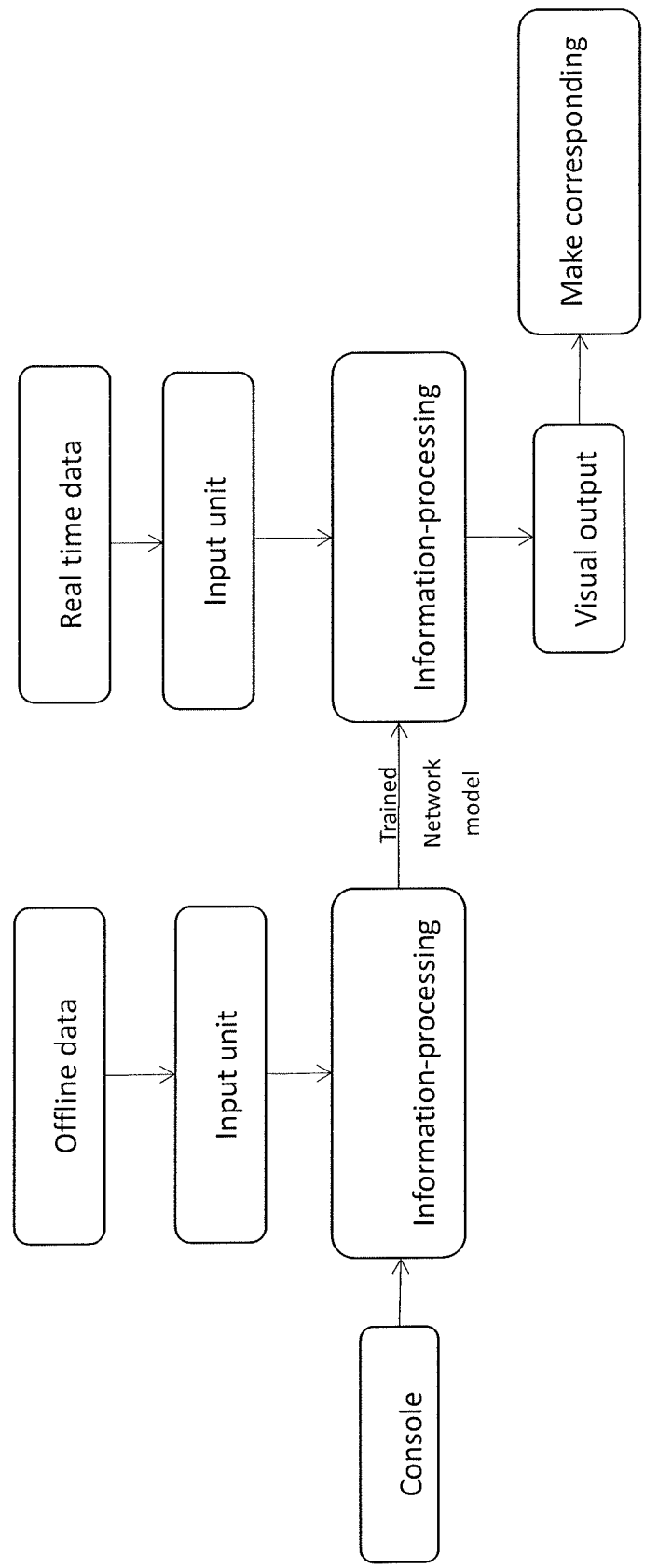
FIG. 7 shows the logic block diagram of the hardware system on which this method is based.

Aiming at the situation of more rainy weather in summer in North China, this method specifically conducts monitoring experiments under rainy conditions. The experimental faults are divided into single faults and compound faults. For a single type of failure, the fuzzy rule for each subsystem is 8, and the enhanced node group is 10. For fault 1, the fault amplitude muh=3.5, the start time is 673, and the end time is 864. The monitoring results are shown in FIG. 3. There are no false positives and false negatives. It has good monitoring performance, and the network training time is 4.85 s, which can detect the occurrence of faults in time. Under the same fault type, change the magnitude of the fault so that when muh=1, the fault occurrence time is the same. The monitoring results are shown in FIG. 4. The network training time is 4.67 s, and the occurrence of the fault can be monitored immediately at the beginning of the fault which has good monitoring performance.

Subsequently, the fault type under rainy conditions was changed to a composite fault for verification. The system has a total of 10 fuzzy subsystems, each of which contains 8 fuzzy rules, and there are 10 enhanced node groups. For fault 3, the amplitude is muh=2, BH=0.45, and the false alarm rate is 0. At 720, there are 5 false alarms, and the false alarm rate is 2.62%. Considering the false alarm and the false alarm, the accuracy rate is ACC. It is 0.37%, which has a good monitoring effect overall, and the time used is 7.85 s, which can detect the occurrence of the fault in time. For fault 4, changing the fault amplitude to muh=2 and BH=0.45, the monitoring effect has not changed, and the detection performance can also be exerted well, and the network training time is 8.07 s. Judging from the monitoring effect of the above 4 failures, compared with the deep neural network, the overall performance of the method of the present invention is less time-consuming for network training under the condition that the monitoring effect is satisfactory, and the sewage treatment is greatly reduced. With the consumption of hardware resources in the plant, ordinary computers can do the job, which saves costs and enables timely online monitoring of faults in the sewage treatment process.

What is claimed is:

1. A fault monitoring method for sewage treatment process based on fuzzy width adaptive learning model comprising: a network training phase and an online monitoring phase; the specific steps are as follows:

A) the network training stage:

1) collect historical data $\{X, Y\}$ of the sewage treatment process as training data, where $X=(x_1, x_2, \ldots, x_N)^T \in \mathbb{R}^{N \times M}$, $Y=(y_1, y_2, \ldots, y_C)^T \in \mathbb{R}^{N \times C}$, Y is used as label data, the label data is 0 during a normal period of the sewage treatment process, and the label data is 1 during a fault period; N is the number of input samples, M is the number of variables, and C is an output dimension, wherein the output dimension is 2, which means normal and faulty states;

2) for input data $X=(x_1, x_2, \ldots, x_N)^T \in \mathbb{R}^{N \times M}$, $X_s=(x_{s1}, xs2, \ldots, x_{sM})$, s=1, 2, \ldots, N; the model has n fuzzy subsystems, m enhanced node groups, and i-th fuzzy subsystem contains K fuzzy rules; a first-order TS fuzzy model is used, where the i-th fuzzy subsystem is taken as an example (i=1, 2, \ldots, n); when the input data is s-th training sample, an output of i-th fuzzy subsystem and k-th fuzzy rule is:

$$z_{sk}^i = f_k^i(x_{s1}, x_{s2}, \ldots, x_{sM}) = \sum_{t=1}^{M} a_{kt}^i x_{st}$$

wherein $f_i^k$ is a polynomial of a first degree, $\alpha_{kt}^i$ is a parameter obtained by initialization which obeys uniform distribution [0,1], t=1, 2, \ldots, M, k=1, 2, \ldots, K is the number of variables;

3) for the s-th training sample, calculate weighted strength $\omega_{sk}^i$ of k-th fuzzy rule of the i-th fuzzy subsystem:

$$\omega_{sk}^i = \frac{\tau_{sk}^i}{\sum_{k=1}^{k_i} \tau_{sk}^i}$$

where $\tau_{sk}^i$ represents weighted strength of kth fuzzy rule of i-th fuzzy subsystem (k=1, 2, \ldots, K) when an input training sample is Xs (xs=(xs1, xs2, \ldots, xsM)), the formula is as follows:

$$\tau_{sk}^i = \prod_{t=1}^{M} \mu_{kt}^i(x_{st})$$

where $\mu_{kt}^i(x_{st})$ is Gaussian membership function (t=1, 2, ..., M) corresponding to the input sample $X_{st}$, and its formula is expressed as:

$$\mu_{kt}^i(x_{st}) = e^{-\left(\frac{x_{st}-c_{kt}^i}{\delta_{kt}^i}\right)^2}$$

$c_{kt}^i$ and $\delta_{kt}^i$ are parameters, and the value of $c_{kt}^i$ is the value of cluster center obtained by C-means clustering, $\delta_{kt}^i=1$;

4) Calculate the output $Z^n$ of n fuzzy subsystems corresponding to sth training sample:

$$Z^n=(Z_1,Z_2,\ldots,Z_n)\in \mathbb{R}^{N\times(k_1+k_2+\ldots k_n)}$$

Wherein, $Z_1, Z_2, \ldots, Z_n$ respectively correspond to the output of n subsystems, $k_1, k_2, \ldots, k_n$ respectively correspond to the number of fuzzy rules of n fuzzy subsystems, and the sth training sample;

taking i-th fuzzy subsystem as an example, for all training samples, an output matrix $Z_i$ is obtained by the following formula:

$$Z_i=(Z_{1i},Z_{2i},\ldots,Z_{Ni})^T\in \mathbb{R}^{N\times K}, i=1,2,\ldots,n$$

Wherein, $Z_{1i}, Z_{2i}, \ldots, Z_{Ni}$ respectively represent an output vector of i-th fuzzy subsystem for N training samples; taking s-th sample as an example, the output vector of i-th fuzzy subsystem can be obtained by the following formula:

$$Z_{si}=(\omega_{s1}^i z_{s1}^i, \omega_{s2}^i z_{s2}^i, \ldots, \omega_{sk_1}^i z_{sk_1}^i)$$

Wherein, $z_{sk}^i$ and $\omega_{sk}^i$ and are obtained by 2) and 3) respectively, and k=1, 2, ..., K;

5) input the output $Z^n$ obtained in 4) into m enhanced node groups mentioned in 2) for nonlinear conversion; wherein, j-th enhanced node group has $L_j$ neurons (j=1, 2, ..., m); for m enhanced node groups, an output matrix can be expressed as:

$$H^m=(H_1,H_2,\ldots,H_m)\in \mathbb{R}^{N\times(L_1+L_2+\ldots L_m)}$$

wherein, $L_1, L_2, \ldots, L_m$ respectively represent the number of neurons contained in m enhanced node groups, $H_1=\xi_j(Z^n W_j+\beta_j)\in \mathbb{R}^{N\times L_j}$ is an output matrix of j-th enhanced node group, and $W_j$ represents connection weight between fuzzy subsystem output and the corresponding enhanced node group, $\beta_j$ represents the deviation between output of fuzzy subsystem and j-th enhanced node group, the values of $W_j$ and $\beta_j$ are randomly generated from [0,1], $\xi_j$ is the activation function, and the formula is $\xi_j=\tan h(\cdot)$;

6) calculate defuzzification output of fuzzy subsystem to obtain D, $\Omega$, for s-th training sample $X_s$, a defuzzification output vector of i-th fuzzy subsystem can be expressed as:

$$F_{si}=\left(\sum_{k=1}^{k_i}\omega_{sk}^i\left(\sum_{t=1}^{M}\delta_{k1}^i\alpha_{kt}^i x_{st}\right),\ldots,\sum_{k=1}^{K}\omega_{sk}^i\left(\sum_{t=1}^{M}\delta_{kC}^i\alpha_{kt}^i x_{st}\right)\right)$$

$$=\sum_{t=1}^{M}\alpha_{kt}^i x_{st}(\omega_{s1}^i,\omega_{s2}^i,\ldots,\omega_{sK}^i)\begin{pmatrix}\delta_{11}^i & \cdots & \delta_{1C}^i \\ \vdots & \ddots & \vdots \\ \delta_{K1}^i & \cdots & \delta_{KC}^i\end{pmatrix}$$

where s=1,2,...,N, then, for all training samples X, the output of the i-th fuzzy subsystem is:

$$F_i=(F_{1i},F_{2i},\ldots,F_{Ni})^T \triangleq D\Omega^i\delta^i \in \mathbb{R}^{N\times C}$$

where $D=diag\left\{\sum_{t=1}^{M}\alpha_{kt}^i x_{1t},\ldots,\sum_{t=1}^{M}\alpha_{kt}^i x_{Nt}\right\}$, $$\Omega^i=\begin{pmatrix}\omega_{11}^i & \cdots & \omega_{1K}^i \\ \vdots & \ddots & \vdots \\ \omega_{N1}^i & \cdots & \omega_{NK}^i\end{pmatrix}, \delta^i=\begin{pmatrix}\delta_{11}^i & \cdots & \delta_{1C}^i \\ \vdots & \ddots & \vdots \\ \delta_{K1}^i & \cdots & \delta_{KC}^i\end{pmatrix}$$

thus, the output of n fuzzy subsystems can be obtained:

$$F^n=\sum_{i=1}^{n}F_i=\sum_{i=1}^{n}D\Omega^i\delta^i=D(\Omega^1,\Omega^2,\ldots,\Omega^n)\begin{pmatrix}\delta^1 \\ \vdots \\ \delta^n\end{pmatrix}=D\Omega\Delta \in \mathbb{R}^{N\times C}$$

wherein, $\Omega=(\Omega^1,\Omega^2,\ldots,\Omega^n)\in \mathbb{R}^{N\times nk}$ is the matrix containing the weighted strengthen $\omega_{sk}^i$ obtained in 3); $\Delta=((\delta^1)^T,\ldots,(\delta^n)^T)^T\in \mathbb{R}^{nK\times C}$ 7) calculate network parameter W, the formula is as follows:

$$\hat{Y}=F^n+H^m W_e=D\Omega\Delta+H^m W_e=(D\Omega,H^m)\begin{pmatrix}\Delta \\ W_e\end{pmatrix}\triangleq(D\Omega,H^m)W$$

wherein $\hat{Y}$ represents a predicted output of the network model

D, $\Omega$, $H^m$ can be obtained by previous steps, by inputting training data Y, the parameter W in the network model can be obtained; the specific formula is as follows:

$$W=(D\Omega,H^m)^+ Y$$

wherein, $(D\Omega,H^m)^+=((D\Omega,H^m))^T(D\Omega,H^m))^{-1}(D\Omega,H^m)^T$, so far, the network model training is complete;

B) the online monitoring phase:

based on the $X_{new}$ obtained from real-time monitoring, new D, $\Omega$, a $H^m$ are calculated; wherein, parameters involved in calculation process are consistent with the network training stage, and then the network model completed by training is used for prediction, and an output value $\hat{Y}$ is converted to zero or one by means of one-hot encoding, wherein zero indicates that the operation is in a normal state; when the output value is temporary, it indicates that the operation is in fault, so as to realize fault monitoring.

* * * * *